United States Patent
Ohmura et al.

(10) Patent No.: US 11,318,934 B2
(45) Date of Patent: May 3, 2022

(54) VEHICLE CONTROL DEVICE, METHOD AND COMPUTER PROGRAM PRODUCT

(71) Applicant: Mazda Motor Corporation, Hiroshima (JP)

(72) Inventors: Hiroshi Ohmura, Aki-gun (JP); Takashi Nakagami, Aki-gun (JP); Xi Chen, Aki-gun (JP)

(73) Assignee: MAZDA MOTOR CORPORATION, Hiroshima (JP)

(*) Notice: Subject to any disclaimer, the term of this patent is extended or adjusted under 35 U.S.C. 154(b) by 121 days.

(21) Appl. No.: 16/819,200

(22) Filed: Mar. 16, 2020

(65) Prior Publication Data

US 2020/0331467 A1 Oct. 22, 2020

(30) Foreign Application Priority Data

Apr. 19, 2019 (JP) .............................. JP2019-079818

(51) Int. Cl.
*B60W 30/09* (2012.01)
*B60T 7/22* (2006.01)
(Continued)

(52) U.S. Cl.
CPC .............. *B60W 30/09* (2013.01); *B60T 7/22* (2013.01); *B60W 10/18* (2013.01); *B60W 30/0956* (2013.01); *B60W 40/04* (2013.01); *G06K 9/00805* (2013.01); *G08G 1/167* (2013.01); *B60T 2201/022* (2013.01);
(Continued)

(58) Field of Classification Search
CPC ......... B60T 2201/022; B60T 2201/024; B60T 7/22; B60W 10/18; B60W 2050/143; B60W 2420/42; B60W 2554/4026; B60W 2554/4041; B60W 2554/4042; B60W 2554/804; B60W 2754/50; B60W 30/09; B60W 30/0953; B60W 30/0956; B60W 30/18154; B60W 30/18159; B60W 40/04; G06K 9/00805; G08G 1/167
See application file for complete search history.

(56) References Cited

U.S. PATENT DOCUMENTS 9,487,139 B1 * 11/2016 Ishida ................... B60W 30/08
10,417,914 B1 * 9/2019 Vose ...................... G08G 1/123
(Continued)

FOREIGN PATENT DOCUMENTS

JP 2018-95097 A 6/2018
JP 2018-197964 A 12/2018

*Primary Examiner* — Babar Sarwar
(74) *Attorney, Agent, or Firm* — Xsensus LLP (57) ABSTRACT

A vehicle control device includes an oncoming vehicle detection sensor and a controller that automatically applies brakes to avoid a collision with the oncoming vehicle, under a condition that the own vehicle is at least partially in an opposite lane or a planned path of the own vehicle is at least partially in the opposite lane. The controller sets a virtual area that moves with the oncoming vehicle and that extends in an advancing direction of the oncoming vehicle, and automatically brakes to avoid to avoid a collision. In response to the sensor detecting first and second oncoming vehicles, the controller sets first and second virtual areas, and automatically brakes the own vehicle to prevent coming into contact with the first virtual area and the second virtual area once the own vehicle traverses the opposite lane.

18 Claims, 6 Drawing Sheets

(51) Int. Cl.
  *B60W 10/18* (2012.01)
  *B60W 30/095* (2012.01)
  *B60W 40/04* (2006.01)
  *G06K 9/00* (2006.01)
  *G08G 1/16* (2006.01)

(52) U.S. Cl.
  CPC .... *B60T 2201/024* (2013.01); *B60W 2420/42* (2013.01); *B60W 2554/4026* (2020.02); *B60W 2554/804* (2020.02); *B60W 2754/50* (2020.02)

(56) References Cited

U.S. PATENT DOCUMENTS

| | | | | |
|---|---|---|---|---|
| 11,009,364 | B2* | 5/2021 | Bai | G01C 21/3484 |
| 11,069,244 | B2* | 7/2021 | Kim | B60G 17/0165 |
| 11,092,458 | B2* | 8/2021 | Aist | B60W 60/0016 |
| 11,110,918 | B2* | 9/2021 | Hudecek | G08G 1/166 |
| 2015/0149037 | A1* | 5/2015 | Lim | B60W 30/09 |
| | | | | 701/41 |
| 2015/0339534 | A1* | 11/2015 | Morikawa | G08G 1/164 |
| | | | | 345/633 |
| 2016/0332569 | A1* | 11/2016 | Ishida | B60W 30/08 |
| 2017/0120908 | A1* | 5/2017 | Oniwa | B60W 30/10 |
| 2017/0120909 | A1* | 5/2017 | Oniwa | B60W 30/12 |
| 2017/0120912 | A1* | 5/2017 | Ishioka | B60W 40/04 |
| 2017/0291545 | A1* | 10/2017 | Lai | G08G 1/166 |
| 2017/0291547 | A1* | 10/2017 | Lai | G08G 1/167 |
| 2017/0349171 | A1* | 12/2017 | Jordan | B60W 10/30 |
| 2018/0174463 | A1* | 6/2018 | Ohta | G08G 1/166 |
| 2018/0354508 | A1* | 12/2018 | Sim | B60W 50/16 |
| 2019/0291729 | A1* | 9/2019 | Kamiya | B60T 7/12 |

\* cited by examiner

VEHICLE CONTROL DEVICE, METHOD AND COMPUTER PROGRAM PRODUCT

CROSS-REFERENCE TO RELATED APPLICATION

The present application claims priority to JP 2019-079818, filed Apr. 19, 2019, the entire contents of which are incorporated herein by reference.

BACKGROUND

Field of the Disclosure

The present disclosure relates to a vehicle control device which assists traveling of a vehicle.

Description of the Related Art

Conventionally, to avoid a collision between an own vehicle (i.e., the subject vehicle) and a predetermined object (an oncoming vehicle, a preceding vehicle, a pedestrian, an obstacle or the like) around the own vehicle, a technique relating to an automatic brake for causing the own vehicle to be automatically braked has been proposed. For example, Japanese Patent Laid-Open No. 2018-95097 (patent document 1) discloses a technique where the crossing position of the travel locus of the own vehicle and the travel locus of an oncoming vehicle is acquired, and the automatic brake is controlled corresponding to the time required for the own vehicle to arrive at this crossing position. Further, for example, Japanese Patent Laid-Open No. 2018-197964 (patent document 2) discloses a technique where a virtual stop line is set on map data based on stop positions of a plurality of vehicles, and an automatic brake is controlled such that the vehicle is caused to stop at this virtual stop line.

SUMMARY OF THE DISCLOSURE

In the conventional technique, to avoid a collision between an own vehicle and an oncoming vehicle when the own vehicle traverses an opposite lane, the automatic brake is controlled basically based on a possibility of a direct collision of the own vehicle with the oncoming vehicle (typically, Time to Collision (TTC) where the own vehicle collides with the oncoming vehicle). However, conventionally, as recognized by the present inventor, there has been no technique where, when the own vehicle traverses an opposite lane, a virtual object which corresponds to an oncoming vehicle is set, and the automatic brake is controlled not based on the oncoming vehicle, but based on this virtual object. That is, there is no technique where the automatic brake is controlled such that the own vehicle is prevented from coming into contact with the virtual object, thus avoiding a collision between the own vehicle and the oncoming vehicle eventually. If the automatic brake is controlled based on the virtual object which corresponds to the oncoming vehicle as described above, it can be considered that a collision between the own vehicle and the oncoming vehicle can be effectively avoided when the own vehicle traverses the opposite lane.

In the technique disclosed in patent document 2, a virtual stop line is set. However, the object of this technique is to specify a specific stop position, where the own vehicle should be caused to stop, on map data, but is not to avoid a collision between the own vehicle and an oncoming vehicle when the own vehicle traverses an opposite lane.

The present disclosure has been made to overcome the above-mentioned and other problems, and it is an object of the present disclosure to provide a vehicle control device which can effectively avoid a collision between the own vehicle and the oncoming vehicle and the like when the own vehicle traverses an opposite lane.

To achieve the above-mentioned and other objects, the present disclosure is directed to a vehicle control device (as well as a method and non-transitory computer readable medium) that includes an oncoming vehicle detection sensor configured to detect an oncoming vehicle that approaches an own vehicle; and a controller configured to automatically apply brakes to the own vehicle to avoid a collision with the oncoming vehicle, detected by the oncoming vehicle detection sensor, under a condition that the own vehicle is at least partially in an opposite lane or a planned path of the own vehicle is at least partially in the opposite lane, wherein the controller is configured to set, between the own vehicle and the oncoming vehicle, a virtual area that moves with the oncoming vehicle and that extends in an advancing direction of the oncoming vehicle, and automatically brakes the own vehicle to avoid the own vehicle coming into contact with the virtual area to avoid the collision between the own vehicle and the oncoming vehicle, wherein under a condition that the oncoming vehicle detection sensor detects a first oncoming vehicle and a second oncoming vehicle that can feasibly pass the first oncoming vehicle by passing on a lateral side of the first oncoming vehicle in the opposite lane, the controller is further configured to set a first virtual area with respect to the first oncoming vehicle, and set a second virtual area with respect to the second oncoming vehicle, and automatically brake the own vehicle to prevent coming into contact with the first virtual area and the second virtual area once the own vehicle traverses the opposite lane.

In the present disclosure configured as described above, the controller sets the virtual area as the virtual object which is specified to avoid a collision between the own vehicle and the oncoming vehicle when the own vehicle traverses the opposite lane, the virtual object forming an application object of the automatic brake control. Specifically, the controller sets, between the own vehicle and the oncoming vehicle, the virtual area which moves with advance of the oncoming vehicle, and which extends in an advancing direction of the oncoming vehicle. That is, the virtual area is not set to shield the front side of the own vehicle, but is set on the lateral side of the own vehicle. Further, the virtual area extends along the traveling lane of the own vehicle and the opposite lane. With such a configuration, it is possible to cause the own vehicle to appropriately stop at a position relatively separated from the oncoming vehicle. Accordingly, it is possible to effectively avoid a collision between the own vehicle and the oncoming vehicle. Further, in the present disclosure, when the first oncoming vehicle and the second oncoming vehicle are detected, it is possible to effectively avoid a collision between the own vehicle and the first oncoming vehicle, and a collision between the own vehicle and the second oncoming vehicle which is present behind the first oncoming vehicle. Particularly, in the present disclosure, for example, when the first oncoming vehicle reduces a speed in front of an intersection, it is possible to effectively avoid a collision between the own vehicle and the second oncoming vehicle which enters the intersection without reducing a speed.

In the present disclosure, the controller is optionally configured to set the first virtual area and the second virtual area along a center line of a road on which the own vehicle and the oncoming vehicle travel.

According to the present disclosure configured as described above, it is possible to inhibit that the own vehicle protrudes to the opposite lane while crossing the center line, that is, it is possible to inhibit that a portion of the own vehicle obstructs the opposite lane. Accordingly, it is possible to more effectively avoid a collision between the own vehicle and the oncoming vehicle.

In the present disclosure, under a condition that, after the second oncoming vehicle traveling on a rear side or a lateral side of the first oncoming vehicle is detected by the oncoming vehicle detection sensor, and no second oncoming vehicle is detected, the controller continues to set the second virtual area assuming that the second oncoming vehicle travels at a position of a predetermined blind spot of the first oncoming vehicle in the opposite lane.

According to the present disclosure configured as described above, in a case where the second oncoming vehicle is detected once, even if the second oncoming vehicle is not detected thereafter, the second virtual area is set assuming that the second oncoming vehicle is present in the blind spot of the first oncoming vehicle. With such a configuration, in the present disclosure, it is possible to prevent a collision between the own vehicle and the second oncoming vehicle which suddenly appears from behind the first oncoming vehicle.

In the present disclosure, specifically, the second oncoming vehicle is a small vehicle including a motorcycle, a three-wheeled motorcycle, and a bicycle.

In the present disclosure, the controller is optionally configured to set a front end of the virtual area on an own vehicle side at a position separated from a front end of the oncoming vehicle by a distance that corresponds to a relative speed of the own vehicle and the oncoming vehicle.

According to the present disclosure configured as described above, it is possible to appropriately inhibit contact of the own vehicle with the oncoming vehicle during the period before the own vehicle finishes passing through the opposite lane. Particularly, it is possible to appropriately inhibit contact between the rear end of the own vehicle and the front end of the oncoming vehicle.

In the present disclosure, the controller is optionally configured to set a rear end of the virtual area on an oncoming vehicle side at a position separated from a rear end of the oncoming vehicle by a distance that corresponds to a speed of the oncoming vehicle, or at a position of the rear end of the oncoming vehicle.

According to the present disclosure configured as described above, it is possible to appropriately inhibit contact of the own vehicle with the oncoming vehicle when the own vehicle starts to pass through the opposite lane. Particularly, it is possible to appropriately inhibit contact between the front end of the own vehicle and the rear end of the oncoming vehicle.

According to the vehicle control device of the present disclosure, it is possible to effectively avoid a collision between the own vehicle and the oncoming vehicle and the like when the own vehicle traverses the opposite lane.

DETAILED DESCRIPTION OF THE EMBODIMENTS

Hereinafter, a vehicle control device according to an embodiment of the present disclosure will be described with reference to attached drawings.

Configuration of Vehicle Control Device

Figure 1:
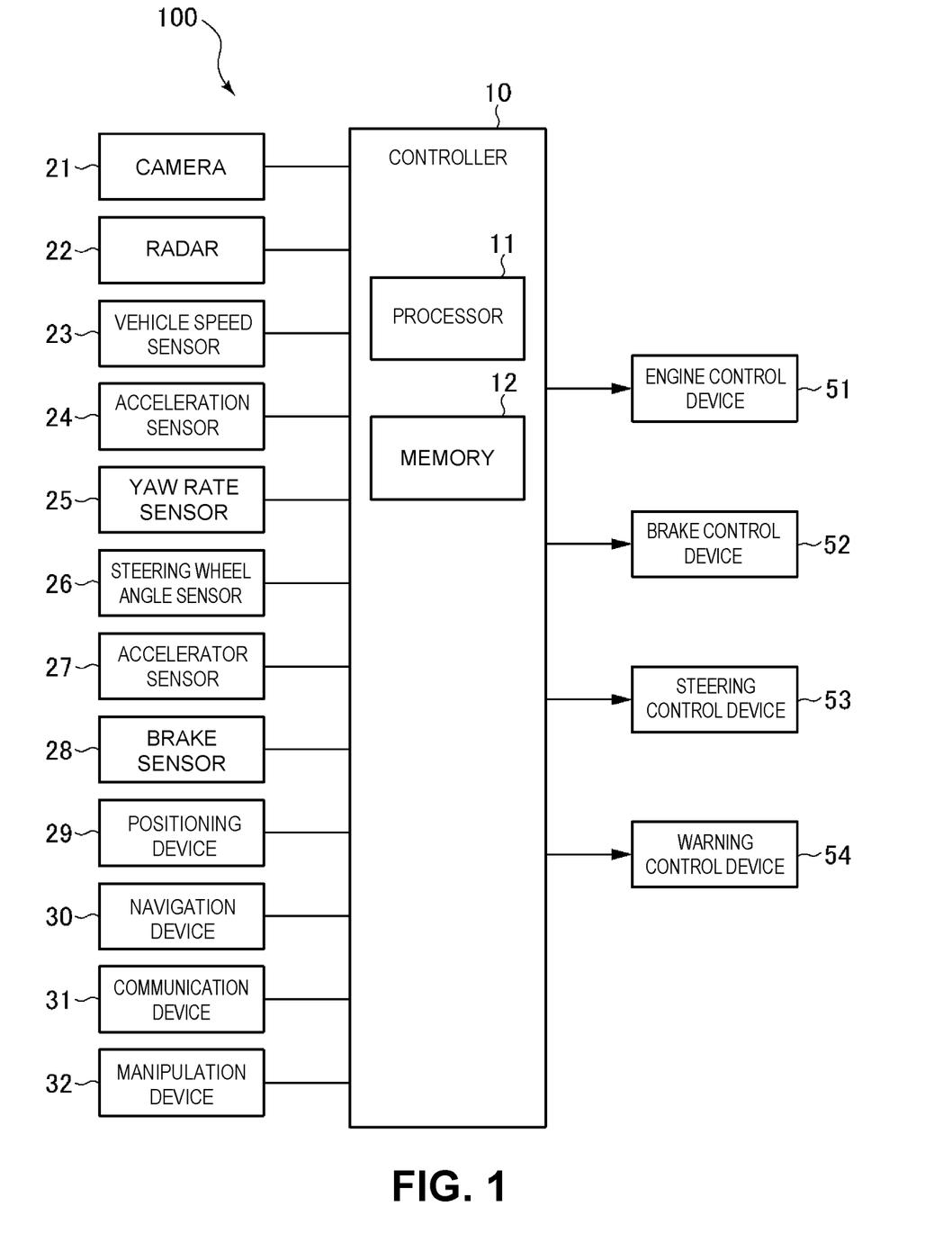
FIG. 1 is a block diagram showing the schematic configuration of a vehicle control device according to an embodiment of the present disclosure.

First, the configuration of the vehicle control device according to the embodiment of the present disclosure will be described with reference to FIG. 1. FIG. 1 is a block diagram showing the schematic configuration of the vehicle control device according to an embodiment of the present disclosure.

As shown in FIG. 1, a vehicle control device 100 mainly includes a controller 10, such as an ECU (Electronic Control Unit), a plurality of sensors and switches, and a plurality of control devices. This vehicle control device 100 is mounted on a vehicle, and performs various controls to assist traveling of the vehicle. Optionally, the ECU may include the processor 835 and other circuitry in system 800 of FIG. 10, which may be implemented as a single processor-based system, or a distributed processor based system, including remote processing, such as cloud based processing.

The plurality of sensors and switches include a camera 21, (having an image sensor that takes fixed and/or moving images in the visual spectrum and/or non-visual ranges such as infrared and ultraviolet), a radar and/or Lidar 22 (short-range radars, SRR, that operate, for example, in the 20 GHz to 27 GHz range, long range radars, LRR, operating, for example, in the 76 to 81 GHz range, as well as Lidar that operates in at least one of ultraviolet, visible, and near infrared spectrums using lasers having a principle wavelength, for example, in a range of 500 nm to 1000 nm), a plurality of behavior sensors (a vehicle speed sensor 23, an acceleration sensor 24 (example acceleration sensors employ a signal processor connected to a micromechanical comb structure that forms a capacitor with a capacitance set by the spatial distances between comb teeth. When subject to acceleration, relative displacement of comb teeth creates a capacitive change, which is sensed by the signal processor. Piezoelectric, piezoresistive and micro electro-mechanical system (MEMS) sensors may be used as well), a yaw rate sensor 25) which detect behavior of the vehicle and a plurality of behavior switches (a steering wheel angle sensor 26, an accelerator sensor 27, a brake sensor 28), a positioning device 29, a navigation device 30, a communication device 31, and a manipulation device 32. Further, the plurality of control devices include an engine control device 51, a brake control device 52, a steering control device 53, and a warning control device 54.

The controller 10 is formed of a processor 11, a memory 12, which stores various programs executed by the processor 11, and a computer device including an input/output device and the like. The controller 10 is configured such that, based on signals received from the above-mentioned plurality of sensors and switches, the controller 10 can output control signals for appropriately operating an engine device, a braking device, a steering device, and a warning device to the engine control device 51, the brake control device 52, the steering control device 53, and the warning control device 54. Particularly, in this embodiment, the controller 10 is configured as follows. The controller 10 controls a braking device via the brake control device 52 to avoid a collision between the own vehicle, on which the controller 10 is mounted, and a predetermined object (for example, an oncoming vehicle, a preceding vehicle, a pedestrian, an obstacle or the like) around this own vehicle, thus causing the own vehicle to be automatically braked, that is, causing the automatic brake to be operated.

The camera 21 photographs an area around the vehicle (typically, an area in front of the vehicle, and/or an area in a traveling direction of the vehicle, and/or an area in a traveling direction of the vehicle), and outputs image data. The controller 10 identifies various objects based on the image data received from the camera 21. For example, the controller 10 identifies a preceding vehicle, parked vehicles, pedestrians, the traveling road, division lines (a center line, lane boundary lines, white lines, yellow lines), traffic lights, traffic signs, stop lines, intersections, obstacles and the like.

The radar 22 measures positions and speeds of various objects which are present in the area around the vehicle (typically, the area in front of the vehicle). For example, the radar 22 measures positions and speeds of a preceding vehicle, an oncoming vehicle, parked vehicles, pedestrians, falling objects on the traveling road and the like. A millimeter wave radar may be used as the radar 22, for example. This radar 22 transmits radio waves in the advancing direction of the vehicle, and receives reflected waves generated due to reflection of the transmitted waves on an object. Then, based on the transmitted waves and the received waves, the radar 22 measures a distance between the vehicle and the object (an inter-vehicle distance, for example) and the relative speed of the object with respect to the vehicle.

Note that a laser radar may be used as the radar 22 in place of the millimeter wave radar, or an ultrasonic sensor or another sensor may also be used in place of the radar 22. Further, the position and the speed of an object may also be measured by using the plurality of sensors in combination.

The vehicle speed sensor 23 detects the speed of the vehicle (vehicle speed). The acceleration sensor 24 detects acceleration of the vehicle. The yaw rate sensor 25 detects a yaw rate generated in the vehicle. The steering wheel angle sensor 26 detects the rotation angle (steering angle) of a steering wheel of the vehicle. The accelerator sensor 27 detects the pressing amount of an accelerator pedal. The brake sensor 28 detects the pressing amount of a brake pedal. The controller 10 can calculate the speed of an object based on the speed of a vehicle 1, which is detected by the vehicle speed sensor 23, and the relative speed of the object, which is detected by the radar 22.

The positioning device 29 includes a GPS receiver and/or a gyro sensor, and detects the position of the vehicle (current vehicle position information). The navigation device 30 stores map information therein, and can provide the map information to the controller 10. Based on map information and current vehicle position information, the controller 10 identifies, roads, intersections, traffic lights, buildings and the like which are present in the area around the vehicle (particularly in the advancing direction). The map information may be stored in the controller 10.

The communication device 31 performs inter-vehicle communication with other vehicles around the own vehicle, and performs road-vehicle communication with road-side communication devices installed in the area around the own vehicle. The communication device 31 acquires, through such inter-vehicle communication and road-vehicle communication, communication data from other vehicles and traffic data (traffic congestion information, speed limit information and the like) from transportation infrastructure, and the communication device 31 outputs these data to the controller 10.

The manipulation device 32 (a user interface, tactile and/or visual controlled such as a touch panel) is an input device which is provided in a cabin, and which is operated by a driver for performing various settings relating to the vehicle. For example, the manipulation device 32 includes switches and buttons provided to an instrument panel, a dash panel, and a center console, a touch panel provided to a display device and the like. The manipulation device 32 outputs a manipulation signal which corresponds to the manipulation of the driver to the controller 10. In this embodiment, the manipulation device 32 is configured to be capable of switching between ON and OFF of a control for assisting traveling of the vehicle, and to be capable of adjusting contents of control for assisting traveling of the vehicle. For example, operating the manipulation device 32 allows the driver to switch between ON and OFF of the automatic brake for avoiding a collision between the own vehicle and an object, to perform various setting relating to a virtual area which is used when the automatic brake is performed, to perform setting of warning timing for avoiding a collision between the own vehicle and the object, and to switch between ON and OFF of a control for causing the steering wheel to be vibrated for avoiding a collision between the own vehicle and the object.

Note that at least one of the camera 21, the radar 22, and the communication device 31 corresponds to one example of an "oncoming vehicle detection sensor" in the present disclosure for detecting an oncoming vehicle approaching the own vehicle.

The engine control device 51 controls the engine of the vehicle. The engine control device 51 is a component which can adjust an engine output (driving force). For example, the engine control device 51 includes a variable valve train and the like which vary opening/closing timing of a spark plug, a fuel injection valve, a throttle valve, and an intake and exhaust valve. When it is necessary to cause the vehicle to accelerate or decelerate, the controller 10 transmits, to the engine control device 51, a control signal to change an engine output.

The brake control device 52 controls the braking device of the vehicle. The brake control device 52 is a component which can adjust a braking force generated by the braking device, and includes brake actuators, such as a hydraulic pump and a valve unit, for example. When it is necessary to cause the vehicle to decelerate, the controller 10 transmits, to the brake control device 52, a control signal to generate a braking force.

The steering control device 53 controls the steering device of the vehicle. The steering control device 53 is a component which can adjust the steering angle of the vehicle, and includes an electric motor and the like of an electric power steering system, for example. When it is necessary to change the advancing direction of the vehicle, the controller 10 transmits, to the steering control device 53, a control signal to change a steering direction.

The warning control device 54 controls a warning device which can issue a predetermined warning to a driver. This warning device may be the display device, a speaker and the like provided to the vehicle. For example, when a possibility of a collision of the own vehicle with an object increases, the controller 10 transmits a control signal to the warning control device 54 to issue a warning from the warning device. In this example, the controller 10 causes an image for notifying a high possibility of a collision with the object to be displayed on the display device, or causes voice for notifying a high possibility of a collision with the object to be outputted from the speaker.

Automatic Brake Control

Next, the automatic brake control according to the embodiment of the present disclosure will be described. In this embodiment, when an own vehicle traverses an opposite lane (the opposite lane means a lane extending along own vehicle lane, where the own vehicle travels, and opposing the own vehicle lane), the controller 10 performs a control of causing the automatic brake to be operated to avoid a collision of the own vehicle with the oncoming vehicle which travels on the opposite lane. Hereinafter, various embodiments relating to the automatic brake control will be described.

First Embodiment

Figure 2:
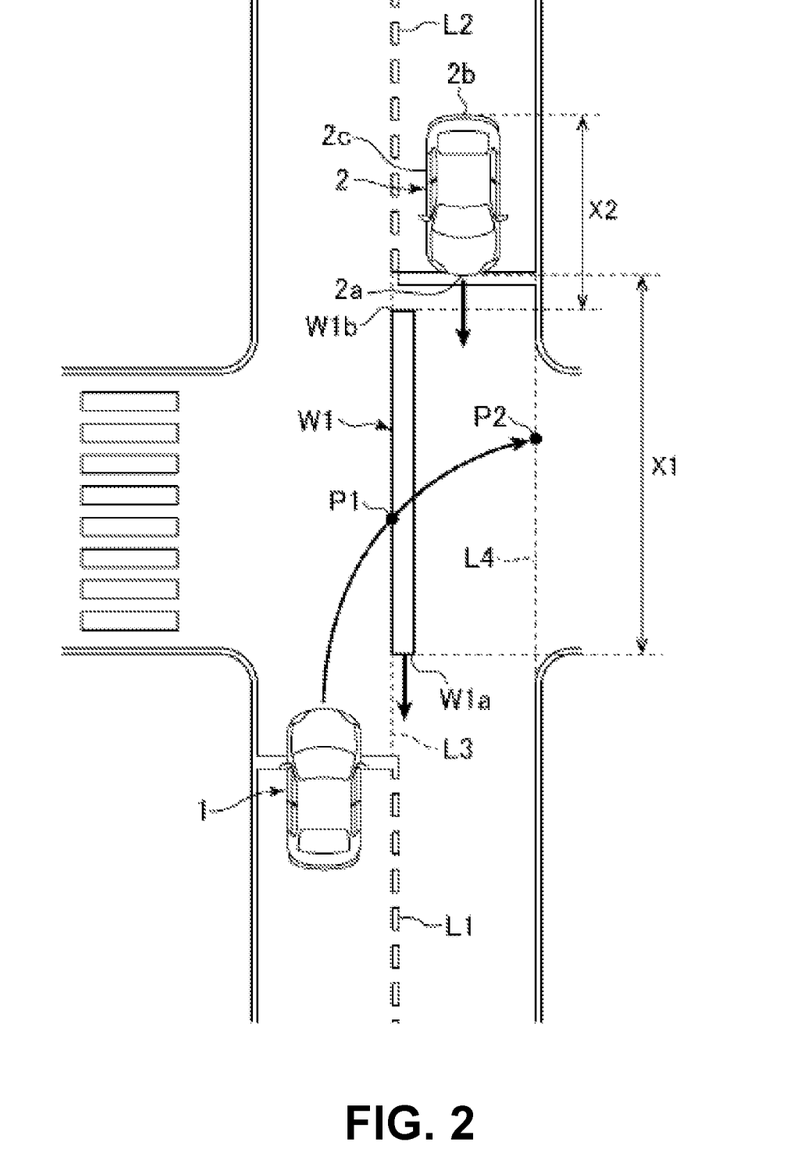
FIG. 2 is an explanatory view of the automatic brake control according to a first embodiment of the present disclosure.

First, an automatic brake control according to a first embodiment of the present disclosure will be described with reference to FIG. 2. FIG. 2 shows a situation where the own vehicle 1 is attempting to traverse the opposite lane by turning right at an intersection (this is in reference to driving in Japan, where an intersection is crossed when turning right, in a similar manner to how a vehicle traverses an opposite lane when turning left in an intersection in the US).

In the flowchart shown in FIG. 2, there is a possibility of a collision of the own vehicle 1 with an oncoming vehicle 2. Accordingly, the controller 10 controls the operation of the automatic brake to avoid a collision between the own vehicle 1 and the oncoming vehicle 2. Particularly, in this embodiment, the controller 10 sets a virtual area W1 between the own vehicle 1 and the oncoming vehicle 2, and controls the automatic brake such that the own vehicle 1 is prevented from coming into contact with this virtual area W1. The virtual area W1 moves with the advance of the oncoming vehicle 2. In other words, the virtual area W1 advances toward the own vehicle 1 together with the oncoming vehicle 2, and extends in the advancing direction of the oncoming vehicle 2. That is, in this embodiment, the controller 10 controls the automatic brake such that the own vehicle 1 is prevented from coming into contact with the virtual area W1, thus preventing a collision of the own vehicle 1 with the oncoming vehicle 2 eventually. With such a configuration, it is possible to effectively avoid a collision between the own vehicle 1 and the oncoming vehicle 2.

In this embodiment, the virtual area is a virtual object which is specified to avoid a collision between the own vehicle 1 and the oncoming vehicle 2, the virtual object forming an application object of the automatic brake control. Further, the virtual area has at least a length specified by a front end W1a on the own vehicle side and a rear end W1b on the oncoming vehicle side (that is, a length from the front end W1a to the rear end W1b). In addition to such a length, the virtual area may also have a certain width specified (the width may be a fixed width or a width which can be changed corresponding to the situation). However, basically, the height of the virtual area is not specified.

Further, in this embodiment, the controller 10 sets the virtual area W1 along the center line of the road where the own vehicle 1 and the oncoming vehicle 2 travel. Specifically, the controller 10 sets the virtual area W1 such that the virtual area W1 extends parallel to the center line and is positioned on the center line. Such setting can inhibit that the own vehicle 1 protrudes into the opposite lane while crossing the center line, that is, can inhibit that a portion of the own vehicle 1 obstructs the opposite lane.

In general, there are many cases where a center line is not drawn at an intersection. Accordingly, when the own vehicle 1 traverses the opposite lane at an intersection where the center line is not drawn as described above, the controller 10 forms a virtual center line L3 to set the virtual area W1. Specifically, the controller 10 forms the virtual center line L3 by connecting a center line L1 and a center line L2 both of which are on the road where the own vehicle 1 and the oncoming vehicle 2 travel, the center line L1 being on the road on the own vehicle side with the intersection interposed between the own vehicle 1 and the oncoming vehicle 2, and the center line L2 being on the road on the oncoming vehicle side with the intersection interposed between the own vehicle 1 and the oncoming vehicle 2. To be more specific, the controller 10 forms the virtual center line L3 by connecting the end point of the center line L1 and the end point of the center line L2 by a straight line. With such a configuration, when the own vehicle 1 traverses the opposite lane at an intersection where the center line is not drawn, it is possible to appropriately specify a center line which is used for setting the above-mentioned virtual area W1.

Even in the case where the own vehicle 1 traverses the opposite lane at an intersection where the center line is not drawn, when the oncoming vehicle 2 is away from the own vehicle 1 by a large distance, that is, when the oncoming vehicle 2 is away from the intersection by a large distance, it is sufficient to set the virtual area W1 using the center line L2 on the oncoming vehicle side. Whereas when the oncoming vehicle 2 is very close to the own vehicle 1 (for example, when the oncoming vehicle 2 is passing through the intersection), it is sufficient to set the virtual area W1 using the center line L1 on the own vehicle side.

Further, in this embodiment, the controller 10 sets the front end W1a of the virtual area W1 on the own vehicle side at a position separated from a front end 2a of the oncoming vehicle 2 by a distance X1 which corresponds to the relative speed of the own vehicle 1 and the oncoming vehicle 2. Specifically, the controller 10 first acquires the time required for the own vehicle 1 to finish passing through the opposite lane (hereinafter referred to as "t2"). To be more specific, the controller 10 identifies a point P2 where a travel locus of the own vehicle 1 traversing the opposite lane and the side end of the opposite lane on the side opposite to the center line (indicated by a broken line L4) intersect with each other. Then, the controller 10 acquires the time required for the rear end of the own vehicle 1 to arrive at the point P2 (arriving time) as a time t2 which is required for the own vehicle 1 to finish passing through the opposite lane.

Thereafter, the controller 10 sets the front end W1a of the virtual area W1 at a position separated from the front end 2a of the oncoming vehicle 2 by the distance X1 obtained by multiplying the relative speed of the own vehicle 1 and the oncoming vehicle 2 by the acquired arriving time t2. If the speed (absolute value) of the own vehicle 1 is denoted by "V1", and the speed (absolute value) of the oncoming vehicle 2 is denoted by "V2", the distance X1 is expressed by "X1=(V1+V2)×t2". By specifying the front end W1a of the virtual area W1 as described above, it is possible to appropriately inhibit contact of the own vehicle 1 with the oncoming vehicle 2 during the period before the own vehicle 1 finishes passing through the opposite lane. Particularly, it is possible to appropriately inhibit contact between the rear end of the own vehicle 1 and the front end 2a of the oncoming vehicle 2.

Further, in this embodiment, the controller 10 sets the rear end W1b of the virtual area W1 on the oncoming vehicle side at a position separated from a rear end 2b of the oncoming vehicle 2 by a distance X2 which corresponds to a speed V2 of the oncoming vehicle 2. Specifically, the controller 10 first acquires the time required for the own vehicle 1 to arrive at the virtual center line L3 (hereinafter referred to as "t1"). To be more specific, the controller 10 identifies a point P1 where the travel locus of the own vehicle 1 traversing the opposite lane and the virtual center line L3 intersect with each other. Then, the controller 10 acquires the time required for the front end of the own vehicle 1 to arrive at the point P1 (arriving time) as a time t1 which is required for the own vehicle 1 to arrive at the virtual center line L3.

Thereafter, the controller 10 sets the rear end W1b of the virtual area W1 at a position separated from the rear end 2b of the oncoming vehicle 2 by the distance X2 obtained by multiplying the speed V2 (absolute value) of the oncoming vehicle 2 by the acquired arriving time t1. This distance X2 is expressed by "X2=V2×t1". By specifying the rear end W1b of the virtual area W1 as described above, it is possible to appropriately inhibit contact of the own vehicle 1 with the oncoming vehicle 2 when the own vehicle 1 starts to pass through the opposite lane. Particularly, it is possible to appropriately inhibit contact between the front end of the own vehicle 1 and the rear end 2b of the oncoming vehicle 2. Note that when the speed V2 of the oncoming vehicle 2 is zero, that is, when the oncoming vehicle 2 is in a stopped state, the distance X2 is zero. In this case, the controller 10 sets the rear end W1b of the virtual area W1 at the position of the rear end 2b of the oncoming vehicle 2.

Figure 3:
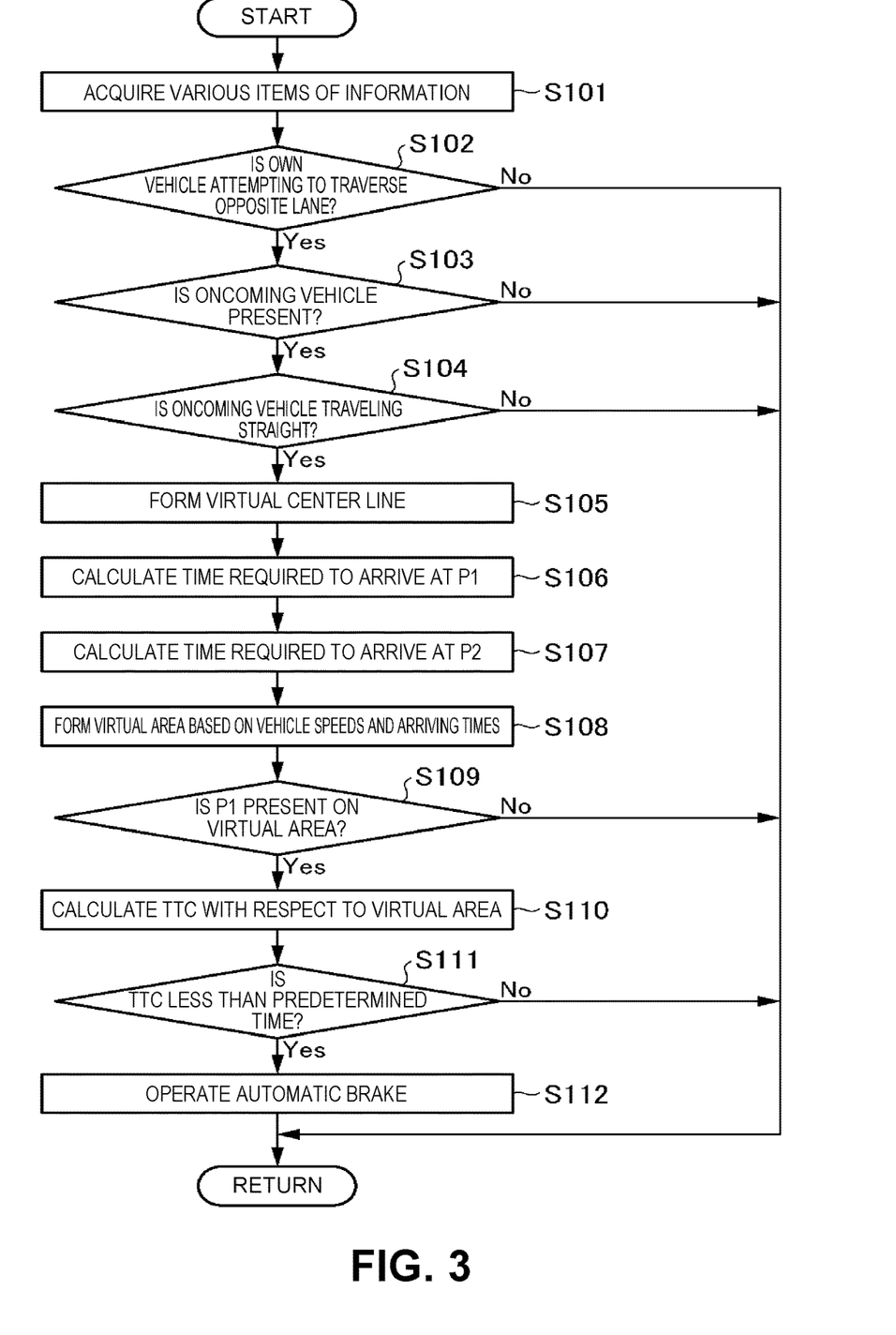
FIG. 3 is a flowchart showing an automatic brake control according to the first embodiment of the present disclosure.

Next, FIG. 3 is a flowchart showing the automatic brake control according to the first embodiment of the present disclosure. The process of this flowchart is repeatedly performed in a predetermined cycle (in a 100 ms cycle, for example) by the controller 10.

First, in step S101, the controller 10 acquires various items of information from the above-mentioned plurality of sensors and switches. Specifically, the controller 10 acquires signals inputted from the camera 21, the radar 22, the vehicle speed sensor 23, the acceleration sensor 24, the yaw rate sensor 25, the steering wheel angle sensor 26, the accelerator sensor 27, the brake sensor 28, the positioning device 29, the navigation device 30, the communication device 31, and the manipulation device 32.

Next, in step S102, the controller 10 determines whether or not the own vehicle 1 is attempting to traverse the opposite lane. Particularly, the controller 10 determines whether or not the own vehicle 1 is attempting to traverse the opposite lane by turning right at the intersection. For example, when a blinker manipulation is performed by a driver to turn right, when the steering wheel is manipulated in the clockwise direction in a situation where the speed of the own vehicle 1 is reduced to less than a predetermined speed, or when a guide route set by the navigation device 30 includes a route where the own vehicle 1 turns right at the next intersection, the controller 10 determines that the own vehicle 1 is attempting to traverse the opposite lane by turning right at the intersection. In this case (step S102: Yes), the controller 10 advances the process to step S103. On the other hand, when it is not determined that the own vehicle 1 is attempting to traverse the opposite lane by turning right at the intersection (step S102: No), the controller 10 causes the process to skip a series of routines shown in this flowchart.

Next, in step S103, the controller 10 determines whether or not the oncoming vehicle 2 approaching the own vehicle 1 is present. Specifically, based on a signal inputted from the camera 21 (the signal which corresponds to image data), a signal inputted from the radar 22, a signal inputted from the communication device 31 (a signal which corresponds to inter-vehicle communication) or other signals, the controller 10 performs a process for detecting the oncoming vehicle 2 approaching the own vehicle 1. As a result, when the oncoming vehicle 2 approaching the own vehicle 1 is detected, the controller 10 determines that the oncoming vehicle 2 is present (step S103: Yes), and the process advances to step S104. On the other hand, when the oncoming vehicle 2 approaching the own vehicle 1 is not detected, the controller 10 determines that the oncoming vehicle 2 is not present (step S103: No) so that the process skips the series of routines shown in this flowchart.

Next, in step S104, the controller 10 determines whether or not the oncoming vehicle 2 travels straight, that is, the controller 10 determines whether or not the oncoming vehicle 2 travels straight without turning right or left at the intersection. Specifically, based on signals inputted from the camera 21 and the radar 22, the controller 10 first acquires an angle formed between the advancing direction of the oncoming vehicle 2 and the center line (the center line L2 of the road on the oncoming vehicle side). Thereafter, the controller 10 determines whether or not the acquired angle is less than a predetermined angle (a relatively small angle close to 0 degrees). When the angle formed between the advancing direction of the oncoming vehicle 2 and the center line is less than the predetermined angle, the controller 10 determines that the oncoming vehicle 2 travels straight (step S104: Yes), and the process advances to step S105. On the other hand, when the angle formed between the advancing direction of the oncoming vehicle 2 and the center line is the predetermined angle or more, the controller 10 determines that the oncoming vehicle 2 does not travel straight (step S104: No), that is, the controller 10 determines that the oncoming vehicle 2 turns right or turns left at the intersection so that the process skips the series of routines shown in this flowchart. The situation where the oncoming vehicle 2 turns right or turns left at the intersection as described above does not correspond to a situation where an automatic brake control according to this embodiment based on the virtual area W1 should be performed. Accordingly, the controller 10 does not perform the automatic brake control according to this embodiment to inhibit unnecessary operation of the automatic brake. In the process of step S104, the controller 10 may determine that the oncoming vehicle 2 travels straight when the controller 10 determines based on sensor data (for example, image data acquired by the camera 21) that the oncoming vehicle 2 is not flashing a direction indicator.

Next, in step S105, the controller 10 forms the virtual center line L3 in the intersection. Specifically, based on a signal inputted from the camera 21, that is, based on an image of the area in front of the own vehicle photographed by the camera 21, the controller 10 first identifies the center line L1 and the center line L2 both of which are on the road where the own vehicle 1 and the oncoming vehicle 2 travel, the center line L1 being on the road on the own vehicle side with the intersection interposed between the own vehicle 1 and the oncoming vehicle 2, and the center line L2 being on the road on the oncoming vehicle side with the intersection interposed between the own vehicle 1 and the oncoming vehicle 2. Particularly, the controller 10 identifies the end point of the center line L1 (the point where the center line L1 is cut by the intersection), and the end point of the center line L2 (the point where the center line L2 is cut by the intersection). Thereafter, the controller 10 uses a segment obtained by connecting the end point of the center line L1 and the end point of the center line L2 with each other as the virtual center line L3.

Next, in step S106, the controller 10 acquires the time t1 which is required for the own vehicle 1 to arrive at the point P1 on the virtual center line L3. Specifically, based on a speed V1 of the own vehicle 1, the steering angle of a steering wheel, map data of the intersection (particularly, the road shape) and the like, the controller 10 first acquires the travel locus of the own vehicle 1 traversing the opposite lane and, then, identifies the point P1 where this travel locus and the virtual center line L3 intersect with each other. Thereafter, based on the speed V1 of the own vehicle 1 and the like, the controller 10 acquires the time (arriving time) t1 which is required for a front end of the own vehicle 1 at a current position to arrive at the point P1.

Next, in step S107, the controller 10 acquires the time t2 which is required for the own vehicle 1 to arrive at the point P2, that is, the time t2 which is required for the own vehicle 1 to finish passing through the opposite lane. Specifically, the controller 10 first identifies the point P2 where the travel locus of the own vehicle 1 traversing the opposite lane acquired as described above and a side end L4 of the opposite lane on the side opposite to the center line intersect with each other. Thereafter, based on the speed V1 of the own vehicle 1 and the like, the controller 10 acquires the time (arriving time) t2 which is required for the rear end of the own vehicle 1 at the current position to arrive at the point P2.

Next, in step S108, based on the speeds V1, V2 of the own vehicle 1 and the oncoming vehicle 2, the arriving times t1, t2, which are acquired as described above, and the virtual center line L3, the controller 10 sets the virtual area W1. Specifically, the controller 10 first sets the front end W1a of the virtual area W1 at a position separated from the front end 2a of the oncoming vehicle 2 by the distance X1 obtained by multiplying the relative speed of the own vehicle 1 and the oncoming vehicle 2 by the arriving time t2 (X1=(V1+V2)×t2). Further, the controller 10 sets the rear end W1b of the virtual area W1 at a position separated from the rear end 2b of the oncoming vehicle 2 by the distance X2 obtained by multiplying the speed V2 of the oncoming vehicle 2 by the arriving time t1 (X2=V2×t1). Thereafter, the controller 10 disposes the virtual area W1 having such front end W1a and rear end W1b such that the virtual area W1 extends parallel to the virtual center line L3, and is positioned on the virtual center line L3.

Next, in step S109, the controller 10 determines whether or not the point P1 is present on the virtual area W1. In other words, the controller 10 determines whether or not the virtual area W1 (particularly, the front end W1a of the virtual area W1) arrives at the point P1 due to advance of the oncoming vehicle 2. Specifically, based on the position of the point P1, which is acquired as described above, and the position of the front end W1a of the virtual area W1, the controller 10 performs determination in step S109. As a result, when it is determined that the point P1 is present on the virtual area W1 (step S109: Yes), the controller 10 advances the process to step S110. On the other hand, when it is not determined that the point P1 is present on the virtual area W1 (step S109: No), the controller 10 causes the process to skip the series of routines shown in this flowchart. When the point P1 is not present on the virtual area W1 as described above, the oncoming vehicle 2 is sufficiently away from the own vehicle 1. That is, even when the own vehicle 1 traverses the opposite lane, there is no possibility of a collision with the oncoming vehicle 2. Accordingly, the controller 10 does not perform an automatic brake control according to this embodiment based on the virtual area W1.

Next, in step S110, the controller 10 acquires Time to Collision/predicted time to collision (TTC) remaining until the own vehicle 1 collides with the virtual area W1. Specifically, it is assumed that the own vehicle 1 collides with the virtual area W1 when the own vehicle 1 arrives at the point P1 on the virtual center line L3 and hence, the controller 10 sets the time t1 as TTC.

Next, in step S111, the controller 10 determines whether or not TTC, which is acquired as described above, is less than the predetermined time. This predetermined time is the threshold of TTC which specifies timing at which the operation of the automatic brake is started such that the own vehicle 1 is stopped in front of the virtual area W1. The predetermined time is set by a predetermined arithmetic expression, a simulation, an experiment or the like (the predetermined time may be a fixed value or a variable value).

As a result of step S111, when it is determined that TTC is less than the predetermined time (step S111: Yes), the controller 10 advances the process to step S112. In step S112, the controller 10 controls the braking device via the brake control device 52 such that the automatic brake is operated, that is, the own vehicle 1 is automatically braked. With such control, a braking force is applied to the own vehicle 1 to decelerate the own vehicle 1 and hence, the own vehicle 1 is stopped in front of the virtual area W1.

Note that the controller 10 may control the warning control device 54 such that a warning is issued from the warning device when the automatic brake is operated as described above. That is, the controller 10 may cause an image and/or voice for a notification of high possibility of a collision with the oncoming vehicle 2 to be outputted on/from the display device and/or the speaker with the operation of the automatic brake. For example, it is preferable to issue a warning from the warning device before the automatic brake is operated.

On the other hand, as a result of step S111, when it is not determined that TTC is less than the predetermined time (step S111: No), that is, when TTC is the predetermined time or more, the controller 10 causes the process to skip the series of routines shown in this flowchart. In this case, the controller 10 does not cause the automatic brake to be operated.

Next, the manner of operation and advantageous effects of the first embodiment of the present disclosure will be described. In the first embodiment, the controller 10 sets, between the own vehicle 1 and the oncoming vehicle 2, the virtual area W1 which moves with advance of the oncoming vehicle 2, and which extends in the advancing direction of the oncoming vehicle 2. Further, the controller 10 controls the automatic brake such that the own vehicle 1 is prevented from coming into contact with this virtual area W1. Accordingly, it is possible to cause the own vehicle 1 to be appropriately stopped at a position relatively separated from the oncoming vehicle 2. Therefore, it is possible to effectively avoid a collision between the own vehicle 1 and the oncoming vehicle 2.

In the first embodiment, the controller 10 sets the virtual area W1 along the center line of the road where the own vehicle 1 and the oncoming vehicle 2 travel. Accordingly, it is possible to inhibit that the own vehicle 1 protrudes to the opposite lane while crossing the center line, that is, it is possible to inhibit that a portion of the own vehicle 1 obstructs the opposite lane. Therefore, it is possible to more effectively avoid a collision between the own vehicle 1 and the oncoming vehicle 2.

In the first embodiment, the controller 10 sets the front end W1a of the virtual area W1 at a position separated from the front end 2a of the oncoming vehicle 2 by the distance X1 which corresponds to the relative speed of the own vehicle 1 and the oncoming vehicle 2 (V1+V2). Accordingly, it is possible to appropriately inhibit contact of the own vehicle 1 with the oncoming vehicle 2 during the period before the own vehicle 1 finishes passing through the opposite lane. Particularly, it is possible to appropriately inhibit contact between the rear end of the own vehicle 1 and the front end 2a of the oncoming vehicle 2. To be more specific, the controller 10 sets the front end W1a of the virtual area W1 at a position separated from the front end 2a of the oncoming vehicle 2 by the distance X1 obtained by multiplying the relative speed (V1+V2) by the time t2 which is required for the own vehicle 1 to finish passing through the opposite lane. Therefore, it is possible to inhibit contact of the own vehicle 1 with the oncoming vehicle 2 with certainty during the period before the own vehicle 1 finishes passing through the opposite lane.

In the first embodiment, the controller 10 sets the rear end W1b of the virtual area W1 at a position separated from the rear end 2b of the oncoming vehicle 2 by the distance X2 which corresponds to the speed of the oncoming vehicle 2. Accordingly, when the own vehicle 1 starts to pass through the opposite lane, it is possible to appropriately inhibit contact of the own vehicle 1 with the oncoming vehicle 2. Particularly, it is possible to appropriately inhibit contact between the front end of the own vehicle 1 and the rear end 2b of the oncoming vehicle 2. To be more specific, the controller 10 sets the rear end W1b of the virtual area W1 at a position separated from the rear end 2b of the oncoming vehicle 2 by the distance X2 obtained by multiplying the speed V2 of the oncoming vehicle 2 by the time t1 which is required for the own vehicle 1 to arrive at the center line. Accordingly, it is possible to inhibit contact of the own vehicle 1 with the rear end 2b of the oncoming vehicle 2 with certainty when the own vehicle 1 starts to pass through the opposite lane.

In the above-mentioned first embodiment, the example is shown where, in the situation where the own vehicle 1 turns right at the intersection, the virtual area W1 is set to perform an automatic brake control. However, this automatic brake control is also applicable to places other than the intersection. That is, the automatic brake control according to this embodiment is also applicable to a situation where the own vehicle 1 turns at a place other than the intersection, and traverses an opposite lane. For example, the automatic brake control according to this embodiment is also applicable to a situation where the own vehicle 1 traverses an opposite lane to enter the parking lot or the like of a shop located across the opposite lane.

Assume the case where the automatic brake control according to this embodiment is applied to a situation where the own vehicle 1 traverses an opposite lane at a place other than the intersection as described above. In such a case, the center line is generally drawn on a road at the place other than the intersection. Accordingly, it is unnecessary for the controller 10 to form the above-mentioned virtual center line L3 in performing the automatic brake control according to this embodiment. In this case, it is sufficient that the controller 10 identifies the center line which is actually drawn on the road based on the image of an area in front of the own vehicle photographed by the camera 21, and the controller 10 sets the virtual area W1 based on this center line.

Further, in the above-mentioned embodiment, a braking force is applied to a vehicle by the braking device (the brake control device 52) in performing the automatic brake control. However, in another example, a braking force may be applied to the vehicle by regeneration of an electric motor.

Second Embodiment

Next, an automatic brake control according to a second embodiment of the present disclosure will be described. Hereinafter, a control and the manner of operation and advantageous effects which are different from those of the first embodiment are mainly described, and the description of a control and the manner of operation and advantageous effects substantially equal to those of the first embodiment is omitted when appropriate.

Figure 4:
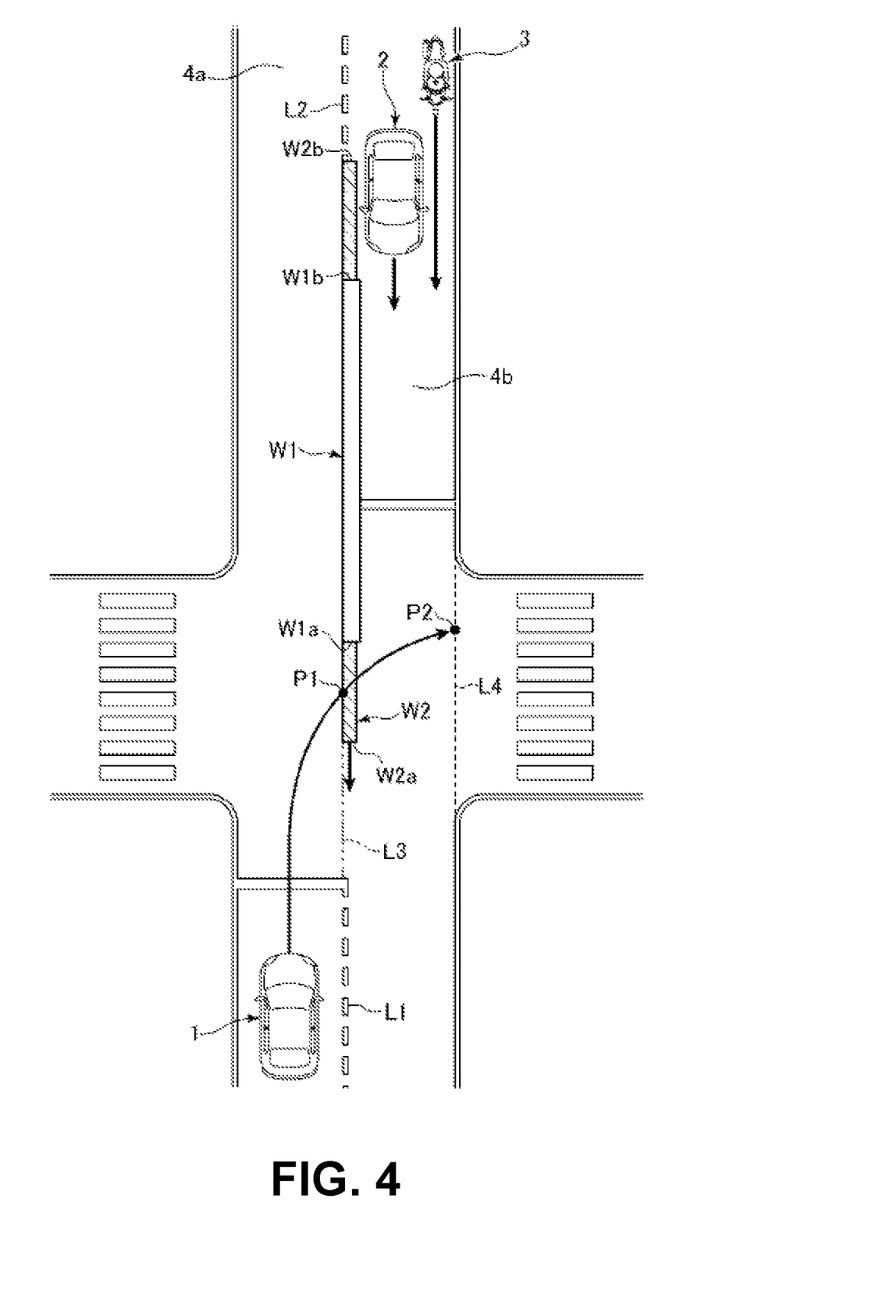
FIG. 4 is an explanatory view of an automatic brake control according to a second embodiment of the present disclosure.

FIG. 4 is an explanatory view of the automatic brake control according to the second embodiment of the present disclosure. FIG. 4 also shows a situation where the own vehicle 1 traveling in the traveling lane 4a is attempting to traverse the opposite lane 4b by turning right at the intersection.

As shown in FIG. 4, in the second embodiment, when the own vehicle 1 traverses the opposite lane 4b in the situation where the oncoming vehicle 2 and a motorcycle 3 are traveling in the opposite lane 4b on the forward side of the own vehicle 1, the automatic brake control is performed to avoid collision with the oncoming vehicle 2 and the motorcycle 3. The motorcycle 3 (second oncoming vehicle) is traveling on the lateral side or the rear side of the oncoming vehicle 2 (first oncoming vehicle), and can pass the oncoming vehicle 2 by passing by the lateral side of the oncoming vehicle 2. In this embodiment, the second oncoming vehicle is a small vehicle including a motorcycle, a three-wheeled motorcycle, a bicycle or the like.

As shown in FIG. 4, the controller 10 sets the virtual area W1 (first virtual area) corresponding to the detection of the oncoming vehicle 2. The controller 10 also sets a virtual area W2 (second virtual area) corresponding to the detection of the motorcycle 3. A method for setting the virtual area is substantially equal to that in the above-mentioned first embodiment. In FIG. 4, the motorcycle 3 is traveling at a higher speed than the oncoming vehicle 2 on the lateral side of the oncoming vehicle 2, and the motorcycle 3 is attempting to pass the oncoming vehicle 2.

Accordingly, in such a situation, the length of the virtual area W2 is larger than the length of the virtual area W1. Specifically, a front end W2a of the virtual area W2 is positioned on the forward side (the own vehicle side) of a front end W1a of the virtual area W1. Further, a rear end W2b of the virtual area W2 is positioned on the rearward side (motorcycle side) of a rear end W1b of the virtual area W1. Note that the relative position in the longitudinal direction (advancing direction) between the front ends of the virtual area W1 and the virtual area W2, and the relative position in the longitudinal direction (advancing direction) between the rear ends of the virtual area W1 and the virtual area W2 may vary corresponding to positions and speeds of the oncoming vehicle 2 and the motorcycle 3.

In FIG. 4, the locus of the own vehicle 1 does not intersect with the virtual area W1. Accordingly, in the case where only the oncoming vehicle 2 is taken into consideration, the own vehicle 1 traverses the opposite lane 4b without stopping in front of the virtual center line L3. However, the locus of the own vehicle 1 intersects with the virtual area W2. Accordingly, when the own vehicle 1 traverses the opposite lane 4b, there is a concern that the own vehicle 1 collides with the motorcycle 3. Therefore, in this embodiment, the virtual area W2 is also set with respect to the motorcycle 3, which is a small vehicle capable of passing the oncoming vehicle 2 by passing by the lateral side of the oncoming vehicle 2. With such a configuration, in this embodiment, it is possible to prevent with certainty a collision of the own vehicle 1 with another vehicle when the own vehicle 1 traverses the opposite lane 4b.

Figure 5:
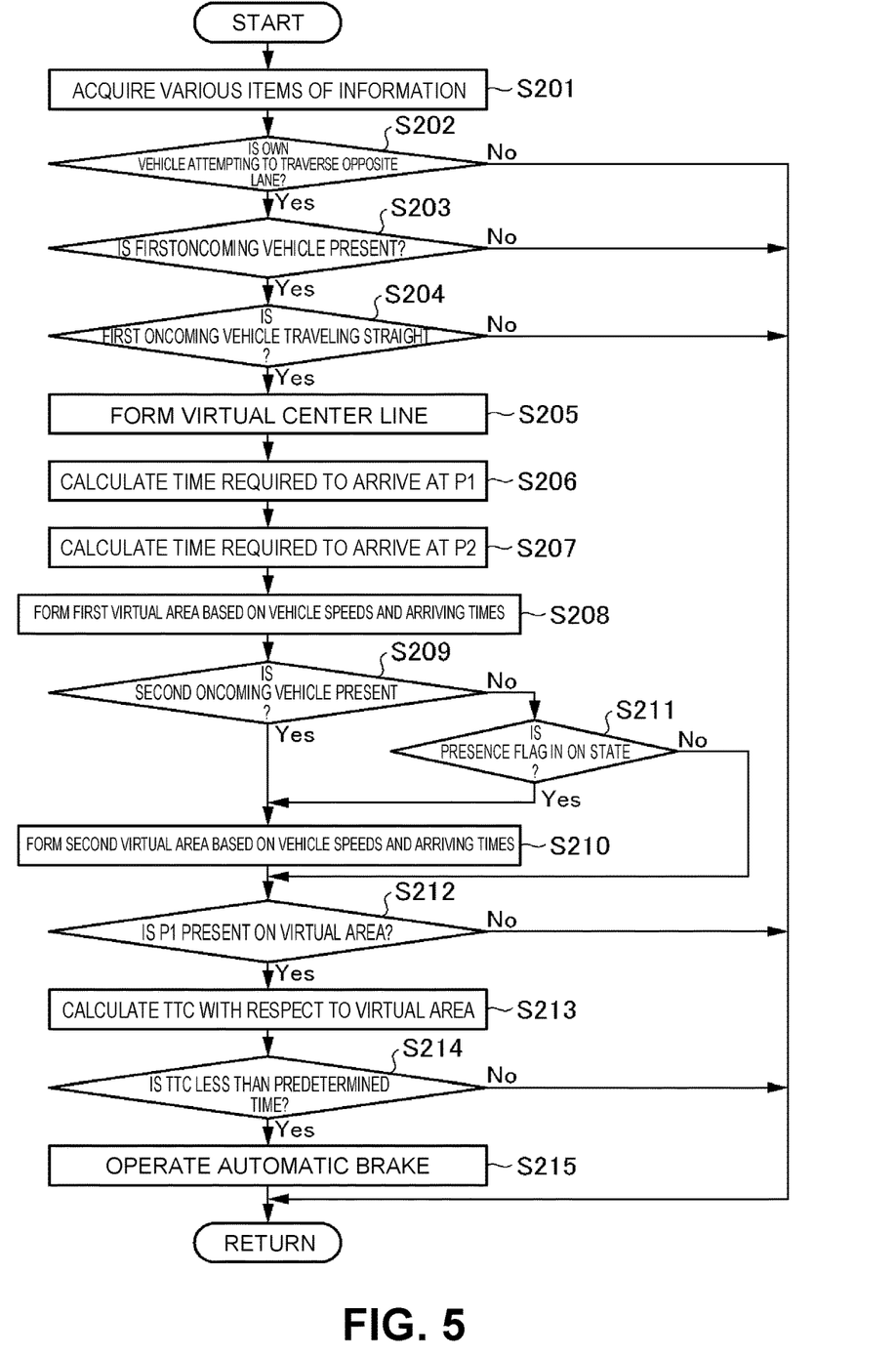
FIG. 5 is a flowchart showing the automatic brake control according to the second embodiment of the present disclosure.

Next, FIG. 5 is a flowchart showing the automatic brake control according to the second embodiment of the present disclosure. The process of this flowchart is also repeatedly performed in a predetermined cycle (in a 100 ms cycle, for example) by the controller 10.

Processes of steps S201 to S208 of the automatic brake control according to the second embodiment are respectively equal to the processes of steps S101 to S108 of the automatic brake control according to the first embodiment. For example, in the situation shown in FIG. 4, the virtual area W1 (first virtual area) is formed by the process of step S208.

Next, in step S209, the controller 10 determines, based on various signals acquired in the process of step S201, whether or not the motorcycle 3 (second oncoming vehicle) is present besides the oncoming vehicle 2 (first oncoming vehicle) in the same manner as the process of step S203.

For example, in the case where image data acquired by camera 21 is used in the determination of the presence of the second oncoming vehicle, the controller 10 determines the presence and kind of a moving body by performing image determination process on a portion (a vehicle body or a rider) of the moving body photographed in the image data together with the first oncoming vehicle. Specifically, in the image determination process, matching determination of images of the small vehicle and the upper half body of the rider is performed with respect to the image data. When the moving body is present and the kind of the moving body is a small vehicle (or a rider on the small vehicle), the controller 10 determines that the second oncoming vehicle is present (step S209: Yes) so that the controller 10 brings a presence flag set in the memory 12 into an ON state, and advances the process to step S210. The controller 10 can identify the position and speed of the second oncoming vehicle based on various items of information acquired in step S201.

When the moving body is not a small vehicle, the moving body (for example, a four-wheeled vehicle) cannot pass the first oncoming vehicle. Accordingly, in this embodiment, when the moving body is not a small vehicle, the controller 10 determines that the second oncoming vehicle is not present.

Next, in step S210, in the same manner as step S108, the controller 10 sets the virtual area W2 (second virtual area) with respect to the motorcycle 3 (second oncoming vehicle).

On the other hand, when it is determined that the second oncoming vehicle is not present (step S209: No), in step S211, the controller 10 determines whether or not it is determined that the second oncoming vehicle is present when the previous process flow of the automatic brake control (FIG. 3) is performed. That is, the controller 10 determines whether or not the presence flag is in an ON state.

In this embodiment, when the second oncoming vehicle is detected once, the presence flag is maintained in an ON state and it is assumed that the second oncoming vehicle is present until the first oncoming vehicle (for example, the oncoming vehicle 2 in FIG. 4) is no longer detected (S203: No). The reason the presence flag is maintained in an ON state is as follows. For example, if the second oncoming vehicle is positioned in the blind spot of the first oncoming vehicle as viewed from the own vehicle 1, the presence of the second oncoming vehicle cannot be identified from image data irrespective of the fact that the second oncoming vehicle is actually present.

For this reason, when the presence flag is in an ON state in step S211, the controller 10 sets the position of the second oncoming vehicle at the position of the blind spot of the own vehicle 1 in the opposite lane 4b, and sets the speed of the second oncoming vehicle to the speed of the second oncoming vehicle used in the previous process flow of the automatic brake control (step S210). The position of the blind spot may be set at a predetermined position on the rear side of the first oncoming vehicle as viewed from the own vehicle 1, for example.

When the presence flag is in an ON state (step S211: Yes), the controller 10 performs the process of step S210 and, thereafter, advances the process to step S212. In this case, in step S212, process is performed on detected two oncoming vehicles (that is, the oncoming vehicle 2 and the motorcycle 3). On the other hand, when the presence flag is in an OFF state (step S211: No), the controller 10 advances the process to step S212. In this case, in step S212, process is performed only on one detected oncoming vehicle (that is, the oncoming vehicle 2).

In the second embodiment, the processes of steps S212 to S215 are respectively equal to the processes of steps S109 to S112 in the first embodiment. In the second embodiment, in the case where the two virtual areas W1, W2 are set, in step S212, the controller 10 determines that the point P1 is present on the virtual area when the point P1 is present on either one of the first virtual area W1 or the second virtual area W2.

Next, the manner of operation and advantageous effects of the second embodiment of the present disclosure will be described. The description of the manner of operation and advantageous effects substantially equal to those of the first embodiment is omitted.

According to the second embodiment, the vehicle control device 100 assists traveling of the own vehicle 1. The vehicle control device 100 includes: the oncoming vehicle detection sensor configured to detect the oncoming vehicle 2 approaching the own vehicle 1; and the controller 10 configured to perform a control of causing the own vehicle 1 to be automatically braked to avoid a collision between the own vehicle 1 and the oncoming vehicle 2, detected by the oncoming vehicle detection sensor, when the own vehicle 1 traverses the opposite lane 4b. The controller 10 is configured to set, between the own vehicle 1 and the oncoming vehicle 2, the virtual area W1 which moves with advance of the oncoming vehicle 2, and which extends in the advancing direction of the oncoming vehicle 2, and cause the own vehicle 1 to be automatically braked such that the own vehicle 1 is prevented from coming into contact with the virtual area W1 to avoid the collision between the own vehicle 1 and the oncoming vehicle 2. In a case where the oncoming vehicle detection sensor detects the oncoming vehicle 2 (first oncoming vehicle) and the motorcycle 3 (second oncoming vehicle) which is capable of passing the oncoming vehicle 2 by passing by the lateral side of the oncoming vehicle 2 in the opposite lane 4b, the controller 10 is configured to set the first virtual area W1 with respect to the oncoming vehicle 2 and set the second virtual area W2 with respect to the motorcycle 3, and cause the own vehicle 1 to be automatically braked such that the own vehicle 1 is prevented from coming into contact with the first virtual area W1 and the second virtual area W2 when the own vehicle 1 traverses the opposite lane 4b.

With such a configuration, in the second embodiment, it is possible to effectively avoid a collision between the own vehicle 1 and the oncoming vehicle 2, and a collision between the own vehicle 1 and the motorcycle 3 which is present behind the oncoming vehicle 2. Particularly, in the second embodiment, when the oncoming vehicle 2 reduces a speed in front of an intersection, it is possible to effectively avoid a collision between the own vehicle 1 and the motorcycle 3 which enters the intersection without reducing a speed.

Further, according to the second embodiment, in a case where, after the motorcycle 3 traveling on the rear side or the lateral side of the oncoming vehicle 2 is detected once by the oncoming vehicle detection sensor, no motorcycle 3 is detected, the controller 10 continues to set the second virtual area W2 assuming that the motorcycle 3 travels at a position of a predetermined blind spot of the oncoming vehicle 2 in the opposite lane 4b. As described above, in the second embodiment, in a case where the motorcycle 3 is detected once, even if the motorcycle 3 is not detected thereafter, the second virtual area W2 is set assuming that the motorcycle 3 is present in the blind spot of the oncoming vehicle 2. With such a configuration, in the second embodiment, it is possible to prevent a collision between the own vehicle 1 and the motorcycle 3 which suddenly appears from behind the oncoming vehicle 2.

The above-mentioned embodiment may be modified as follows.

In the above-mentioned embodiment, the rear end of the virtual area is set at a position separated from the rear end of the oncoming vehicle (the oncoming vehicle 2 and the motorcycle 3) by a distance which corresponds to the speed of the oncoming vehicle. However, the position of the rear end of the virtual area is not limited to such a position, and may be set at the position of the rear end of the oncoming vehicle. By setting the rear end of the virtual area as described above, it is possible to prevent a collision between the own vehicle 1 and the oncoming vehicle with more certainty.

Further, in the above-mentioned embodiment, the virtual center line L3 is formed by referring to the center lines L1, L2 drawn on a road. However, when the center lines L1, L2 are not drawn, the virtual center line L3 cannot be formed. When the center lines are not drawn on a road, the controller 10 may use a virtual line extending along the side surface 2c of the oncoming vehicle 2 (see FIG. 2) in place of the virtual center line L3. The side surface 2c is the side surface of the oncoming vehicle 2 on the own vehicle side. This virtual line may be further offset to the own vehicle side by a predetermined distance. By setting the virtual line as described above, the controller 10 can perform an automatic brake control such that the own vehicle 1 is prevented from entering the traveling range of the oncoming vehicle 2.

The following description relates to a computer environment in which embodiments of the present disclosure may be implemented. This environment may include an embedded computer environment, local multi-processor embodiment, remote (e.g., cloud-based) environment, or a mixture of all the environments.

Figure 6:
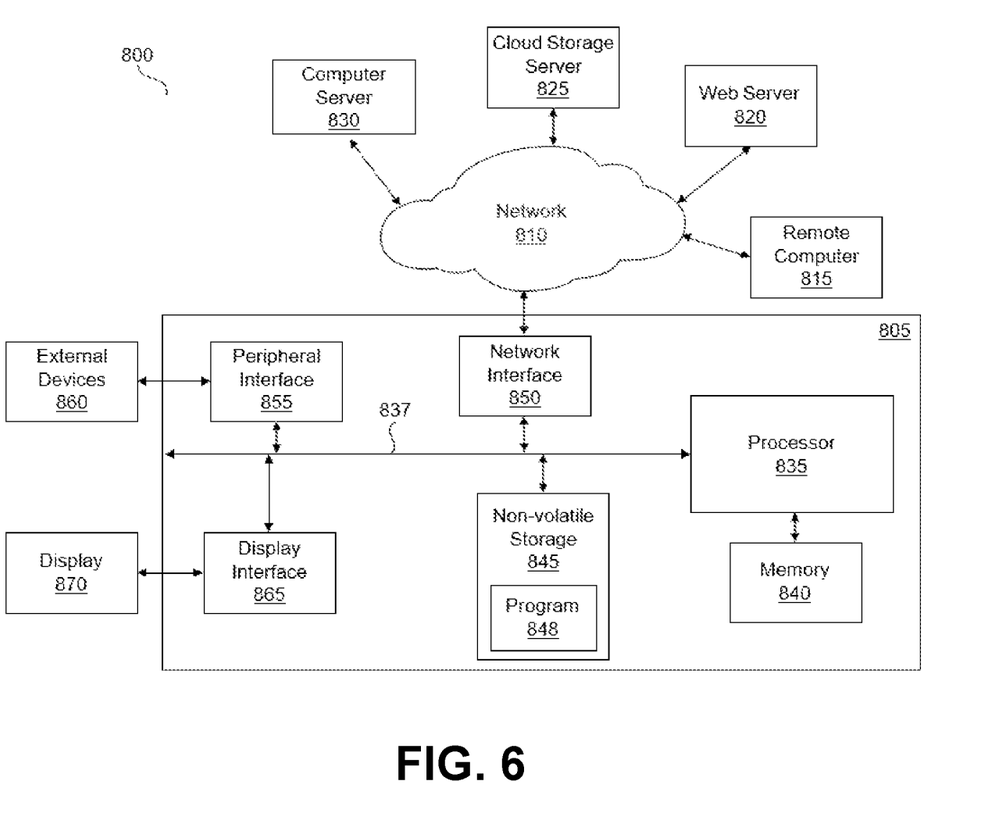
FIG. 6 is a block diagram of computer-based circuitry that may be used to implement control features of the present disclosure.

FIG. 6 illustrates a block diagram of a computer that may implement the various embodiments described herein. The present disclosure may be embodied as a system, a method, and/or a computer program product. The computer program product may include a computer readable storage medium on which computer readable program instructions are recorded that may cause one or more processors to carry out aspects of the embodiment.

The non-transitory computer readable storage medium may be a tangible device that can store instructions for use by an instruction execution device (processor). The computer readable storage medium may be, for example, but is not limited to, an electronic storage device, a magnetic storage device, an optical storage device, an electromagnetic storage device, a semiconductor storage device, or any appropriate combination of these devices. A non-exhaustive list of more specific examples of the computer readable storage medium includes each of the following (and appropriate combinations): flexible disk, hard disk, solid-state drive (SSD), random access memory (RAM), read-only memory (ROM), erasable programmable read-only memory (EPROM or Flash), static random access memory (SRAM), compact disc (CD or CD-ROM), digital versatile disk (DVD) and memory card or stick. A computer readable storage medium, as used in this disclosure, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described in this disclosure can be downloaded to an appropriate computing or processing device from a computer readable storage medium or to an external computer or external storage device via a global network (i.e., the Internet), a local area network, a wide area network and/or a wireless network. The network may include copper transmission wires, optical communication fibers, wireless transmission, routers, firewalls, switches, gateway computers and/or edge servers. A network adapter card or network interface in each computing or processing device may receive computer readable program instructions from the network and forward the computer readable program instructions for storage in a computer readable storage medium within the computing or processing device.

Computer readable program instructions for carrying out operations of the present disclosure may include machine language instructions and/or microcode, which may be compiled or interpreted from source code written in any combination of one or more programming languages, including assembly language, Basic, Fortran, Java, Python, R, C, C++, C# or similar programming languages. The computer readable program instructions may execute entirely on a user's personal computer, notebook computer, tablet, or smartphone, entirely on a remote computer or compute server, or any combination of these computing devices. The remote computer or compute server may be connected to the user's device or devices through a computer network, including a local area network or a wide area network, or a global network (i.e., the Internet). In some embodiments, electronic circuitry including, for example, programmable logic circuitry, field-programmable gate arrays (FPGA), or programmable logic arrays (PLA) may execute the computer readable program instructions by using information from the computer readable program instructions to configure or customize the electronic circuitry, in order to perform aspects of the present disclosure.

Aspects of the present disclosure are described herein with reference to flow diagrams and block diagrams of methods, apparatus (systems), and computer program products according to embodiments of the disclosure. It will be understood by those skilled in the art that each block of the flow diagrams and block diagrams, and combinations of blocks in the flow diagrams and block diagrams, can be implemented by computer readable program instructions.

The computer readable program instructions that may implement the systems and methods described in this disclosure may be provided to one or more processors (and/or one or more cores within a processor) of a general purpose computer, special purpose computer, or other programmable apparatus to produce a machine, such that the instructions, which execute via the processor of the computer or other programmable apparatus, create a system for implementing the functions specified in the flow diagrams and block diagrams in the present disclosure. These computer readable program instructions may also be stored in a computer readable storage medium that can direct a computer, a programmable apparatus, and/or other devices to function in a particular manner, such that the computer readable storage medium having stored instructions is an article of manufacture including instructions which implement aspects of the functions specified in the flow diagrams and block diagrams in the present disclosure.

The computer readable program instructions may also be loaded onto a computer, other programmable apparatus, or other device to cause a series of operational steps to be performed on the computer, other programmable apparatus or other device to produce a computer implemented process, such that the instructions which execute on the computer, other programmable apparatus, or other device implement the functions specified in the flow diagrams and block diagrams in the present disclosure.

FIG. 6 is a functional block diagram illustrating a networked system 800 of one or more networked computers and servers. In an embodiment, the hardware and software environment illustrated in FIG. 6 may provide an exemplary platform for implementation of the software and/or methods according to the present disclosure. Referring to FIG. 6, a networked system 800 may include, but is not limited to, computer 805, network 810, remote computer 815, web server 820, cloud storage server 825 and compute server 830. In some embodiments, multiple instances of one or more of the functional blocks illustrated in FIG. 6 may be employed.

Additional detail of computer 805 is shown in FIG. 6. The functional blocks illustrated within computer 805 are provided only to establish exemplary functionality and are not intended to be exhaustive. And while details are not provided for remote computer 815, web server 820, cloud storage server 825 and compute server 830, these other computers and devices may include similar functionality to that shown for computer 805.

Computer 805 may be a personal computer (PC), a desktop computer, laptop computer, tablet computer, netbook computer, a personal digital assistant (PDA), a smart phone, or any other programmable electronic device capable of communicating with other devices on network 810.

Computer 805 may include processor 835, bus 837, memory 840, non-volatile storage 845, network interface 850, peripheral interface 855 and display interface 865. Each of these functions may be implemented, in some embodiments, as individual electronic subsystems (integrated circuit chip or combination of chips and associated devices), or, in other embodiments, some combination of functions may be implemented on a single chip (sometimes called a system on chip or SoC). Processor 835 may be one or more single or multi-chip microprocessors, such as those designed and/or manufactured by Intel Corporation, Advanced Micro Devices, Inc. (AMD), Arm Holdings (Arm), Apple Computer, etc. Examples of microprocessors include Celeron, Pentium, Core i3, Core i5 and Core i7 from Intel Corporation; Opteron, Phenom, Athlon, Turion and Ryzen from AMD; and Cortex-A, Cortex-R and Cortex-M from Arm.

Bus 837 may be a proprietary or industry standard high-speed parallel or serial peripheral interconnect bus, such as ISA, PCI, PCI Express (PCI-e), AGP, and the like.

Memory 840 and non-volatile storage 845 may be computer-readable storage media. Memory 840 may include any suitable volatile storage devices such as Dynamic Random Access Memory (DRAM) and Static Random Access Memory (SRAM). Non-volatile storage 845 may include one or more of the following: flexible disk, hard disk, solid-state drive (SSD), read-only memory (ROM), erasable programmable read-only memory (EPROM or Flash), compact disc (CD or CD-ROM), digital versatile disk (DVD) and memory card or stick.

Program 848 may be a collection of machine readable instructions and/or data that is stored in non-volatile storage 845 and is used to create, manage and control certain software functions that are discussed in detail elsewhere in the present disclosure and illustrated in the drawings. In some embodiments, memory 840 may be considerably faster than non-volatile storage 845. In such embodiments, program 848 may be transferred from non-volatile storage 845 to memory 840 prior to execution by processor 835.

Computer 805 may be capable of communicating and interacting with other computers via network 810 through network interface 850. Network 810 may be, for example, a local area network (LAN), a wide area network (WAN) such as the Internet, or a combination of the two, and may include wired, wireless, or fiber optic connections. In general, network 810 can be any combination of connections and protocols that support communications between two or more computers and related devices.

Peripheral interface 855 may allow for input and output of data with other devices that may be connected locally with computer 805. For example, peripheral interface 855 may provide a connection to external devices 860. External devices 860 may include devices such as a keyboard, a mouse, a keypad, a touch screen, and/or other suitable input devices. External devices 860 may also include portable computer-readable storage media such as, for example, thumb drives, portable optical or magnetic disks, and memory cards. Software and data used to practice embodiments of the present disclosure, for example, program 848, may be stored on such portable computer-readable storage media. In such embodiments, software may be loaded onto non-volatile storage 845 or, alternatively, directly into memory 840 via peripheral interface 855. Peripheral interface 855 may use an industry standard connection, such as RS-232 or Universal Serial Bus (USB), to connect with external devices 860.

Display interface 865 may connect computer 805 to display 870. Display 870 may be used, in some embodiments, to present a command line or graphical user interface to a user of computer 805. Display interface 865 may connect to display 870 using one or more proprietary or industry standard connections, such as VGA, DVI, DisplayPort and HDMI.

As described above, network interface 850, provides for communications with other computing and storage systems or devices external to computer 805. Software programs and data discussed herein may be downloaded from, for example, remote computer 815, web server 820, cloud storage server 825 and compute server 830 to non-volatile storage 845 through network interface 850 and network 810. Furthermore, the systems and methods described in this disclosure may be executed by one or more computers connected to computer 805 through network interface 850 and network 810. For example, in some embodiments the systems and methods described in this disclosure may be executed by remote computer 815, computer server 830, or a combination of the interconnected computers on network 810.

Data, datasets and/or databases employed in embodiments of the systems and methods described in this disclosure may be stored and or downloaded from remote computer 815, web server 820, cloud storage server 825 and compute server 830.

REFERENCE SIGNS LIST 1 own vehicle
2 oncoming vehicle (first oncoming vehicle)
3 motorcycle (second oncoming vehicle)
10 controller
21 camera
22 radar
23 vehicle speed sensor
52 brake control device
100 vehicle control device
L3 virtual center line
W1, W2 virtual area

What is claimed is:

1. A vehicle control device comprising:
an oncoming vehicle detection sensor configured to detect an oncoming vehicle that approaches an own vehicle; and
a controller configured to automatically apply brakes to the own vehicle to avoid a collision with the oncoming vehicle, detected by the oncoming vehicle detection sensor, under a condition that the own vehicle is at least partially in an opposite lane or a planned path of the own vehicle is at least partially in the opposite lane, wherein
the controller is configured to
set, between the own vehicle and the oncoming vehicle, a virtual area that moves with the oncoming vehicle and that extends in an advancing direction of the oncoming vehicle, and
automatically brake the own vehicle to avoid the own vehicle coming into contact with the virtual area to avoid the collision between the own vehicle and the oncoming vehicle, wherein
under a condition that the oncoming vehicle detection sensor detects a first oncoming vehicle and a second oncoming vehicle that moves to pass the first oncoming vehicle by passing on a lateral side of the first oncoming vehicle in the opposite lane, the controller is further configured to
set a first virtual area with respect to the first oncoming vehicle, and
set a second virtual area with respect to the second oncoming vehicle, and automatically brake the own vehicle to prevent coming into contact with the first virtual area and the second virtual area once the own vehicle traverses the opposite lane,
wherein, under a condition that after the second oncoming vehicle traveling on a rear side or a lateral side of the first oncoming vehicle is detected by the oncoming vehicle detection sensor, and no second oncoming vehicle is detected, the controller continues to set the second virtual area assuming that the second oncoming vehicle travels at a position of a predetermined blind spot of the first oncoming vehicle in the opposite lane.

2. The vehicle control device according to claim 1, wherein
the controller is configured to set the first virtual area and the second virtual area along a center line of a road on which the own vehicle and the oncoming vehicle travel.

3. The vehicle control device according to claim 2, wherein, under a condition that after the second oncoming vehicle traveling on a rear side or a lateral side of the first oncoming vehicle is detected by the oncoming vehicle detection sensor, and no second oncoming vehicle is detected, the controller maintains the second virtual area under a condition that the second oncoming vehicle travels at a position of a predetermined blind spot of the first oncoming vehicle in the opposite lane.

4. The vehicle control device according to claim 2, wherein the second oncoming vehicle is a small vehicle including a motorcycle, a three-wheeled motorcycle, and a bicycle.

5. The vehicle control device according to claim 2, wherein the controller is configured to set a front end of the virtual area on an own vehicle side at a position separated from a front end of the oncoming vehicle by a distance that corresponds to a relative speed of the own vehicle and the oncoming vehicle.

6. The vehicle control device according to claim 2, wherein the controller is configured to set a rear end of the virtual area on an oncoming vehicle side at a position separated from a rear end of the oncoming vehicle by a distance that corresponds to a speed of the oncoming vehicle, or at a position of the rear end of the oncoming vehicle.

7. The vehicle control device according to claim 1, wherein the second oncoming vehicle is a small vehicle including a motorcycle, a three-wheeled motorcycle, and a bicycle.

8. The vehicle control device according to claim 1, wherein the controller is configured to set a front end of the virtual area on an own vehicle side at a position separated from a front end of the oncoming vehicle by a distance that corresponds to a relative speed of the own vehicle and the oncoming vehicle.

9. The vehicle control device according to claim 1, wherein the controller is configured to set a rear end of the virtual area on an oncoming vehicle side at a position separated from a rear end of the oncoming vehicle by a distance which corresponds to a speed of the oncoming vehicle, or at a position of the rear end of the oncoming vehicle.

10. A vehicle control method comprising:
detecting with an oncoming vehicle detection sensor an oncoming vehicle that approaches an own vehicle; and
automatically applying brakes to the own vehicle to avoid a collision with the oncoming vehicle, detected by the oncoming vehicle detection sensor, under a condition that the own vehicle is at least partially in an opposite lane or a planned path of the own vehicle is at least partially in the opposite lane, the automatically applying brakes includes setting, between the own vehicle and the oncoming vehicle, a virtual area that moves with the oncoming vehicle and that extends in an advancing direction of the oncoming vehicle, automatically braking the own vehicle to avoid the own vehicle coming into contact with the virtual area to avoid the collision between the own vehicle and the oncoming vehicle, under a condition that the oncoming vehicle detection sensor detects a first oncoming vehicle and a second oncoming vehicle that moves to pass the first oncoming vehicle by passing on a lateral side of the first oncoming vehicle in the opposite lane, the controller is further configured to setting a first virtual area with respect to the first oncoming vehicle, and setting a second virtual area with respect to the second oncoming vehicle, and automatically braking the own vehicle to prevent coming into contact with the first virtual area and the second virtual area once the own vehicle traverses the opposite lane, wherein, under a condition that after the second oncoming vehicle traveling on a rear side or a lateral side of the first oncoming vehicle is detected by the oncoming vehicle detection sensor, and no second oncoming vehicle is detected, the method further comprises maintaining the second virtual area under a condition that the second oncoming vehicle travels at a position of a predetermined blind spot of the first oncoming vehicle in the opposite lane.

11. The vehicle control method according to claim 10, wherein the setting includes setting the first virtual area and the second virtual area along a center line of a road on which the own vehicle and the oncoming vehicle travel.

12. The vehicle control method according to claim 11, wherein, under a condition that after the second oncoming vehicle traveling on a rear side or a lateral side of the first oncoming vehicle is detected by the oncoming vehicle detection sensor, and no second oncoming vehicle is detected, the method further comprises maintaining the second virtual area under a condition that the second oncoming vehicle travels at a position of a predetermined blind spot of the first oncoming vehicle in the opposite lane.

13. The vehicle control method according to claim 11, wherein the second oncoming vehicle is a small vehicle including a motorcycle, a three-wheeled motorcycle, and a bicycle.

14. The vehicle control method according to claim 11, wherein the setting further includes setting a front end of the virtual area on an own vehicle side at a position separated from a front end of the oncoming vehicle by a distance that corresponds to a relative speed of the own vehicle and the oncoming vehicle.

15. The vehicle control method according to claim 11, wherein the setting further includes setting a rear end of the virtual area on an oncoming vehicle side at a position separated from a rear end of the oncoming vehicle by a distance that corresponds to a speed of the oncoming vehicle, or at a position of the rear end of the oncoming vehicle.

16. The vehicle control method according to claim 10, wherein the second oncoming vehicle is a small vehicle including a motorcycle, a three-wheeled motorcycle, and a bicycle.

17. The vehicle control method according to claim 10, wherein the setting further includes setting a front end of the virtual area on an own vehicle side at a position separated from a front end of the oncoming vehicle by a distance that corresponds to a relative speed of the own vehicle and the oncoming vehicle.

18. A non-transitory computer readable storage including computer readable instructions that when executed by a controller cause the controller to execute a vehicle control method, the method comprising:

detecting with an oncoming vehicle detection sensor an oncoming vehicle that approaches an own vehicle; and automatically applying brakes to the own vehicle to avoid a collision with the oncoming vehicle, detected by the oncoming vehicle detection sensor, under a condition that the own vehicle is at least partially in an opposite lane or a planned path of the own vehicle is at least partially in the opposite lane, the automatically applying brakes includes setting, between the own vehicle and the oncoming vehicle, a virtual area that moves with the oncoming vehicle and that extends in an advancing direction of the oncoming vehicle, automatically braking the own vehicle to avoid the own vehicle coming into contact with the virtual area to avoid the collision between the own vehicle and the oncoming vehicle, under a condition that the oncoming vehicle detection sensor detects a first oncoming vehicle and a second oncoming vehicle that moves to pass the first oncoming vehicle by passing on a lateral side of the first oncoming vehicle in the opposite lane, the controller is further configured to setting a first virtual area with respect to the first oncoming vehicle, and setting a second virtual area with respect to the second oncoming vehicle, and automatically braking the own vehicle to prevent coming into contact with the first virtual area and the second virtual area once the own vehicle traverses the opposite lane, wherein, under a condition that after the second oncoming vehicle traveling on a rear side or a lateral side of the first oncoming vehicle is detected by the oncoming vehicle detection sensor, and no second oncoming vehicle is detected, the method further comprises maintaining the second virtual area under a condition that the second oncoming vehicle travels at a position of a predetermined blind spot of the first oncoming vehicle in the opposite lane.

\* \* \* \* \*